(12) United States Patent
Winger et al.

(10) Patent No.: US 11,841,993 B1
(45) Date of Patent: Dec. 12, 2023

(54) METHOD AND DEVICE FOR TARGET INFORMATION EXFILTRATION OUT OF A COMPUTING DEVICE BASED ON LOCK KEY REFLECTION BY THE COMPUTING DEVICE AT AN OUTPUT KEYBOARD END POINT

(71) Applicants: Dallas Perry Winger, Dallas, TX (US); Darren Dale Kitchen, Dallas, TX (US)

(72) Inventors: Dallas Perry Winger, Dallas, TX (US); Darren Dale Kitchen, Dallas, TX (US)

(73) Assignee: HAK5 LLC, Dallas, TX (US)

( * ) Notice: Subject to any disclaimer, the term of this patent is extended or adjusted under 35 U.S.C. 154(b) by 0 days.

(21) Appl. No.: 17/877,865

(22) Filed: Jul. 29, 2022

(51) Int. Cl.
  *G06F 13/10* (2006.01)
  *G06F 3/02* (2006.01)
  *G06F 13/38* (2006.01)
  *G06F 13/42* (2006.01)

(52) U.S. Cl.
  CPC .......... *G06F 3/0219* (2013.01); *G06F 13/382* (2013.01); *G06F 13/4282* (2013.01); *G06F 2213/0042* (2013.01)

(58) Field of Classification Search
  None
  See application file for complete search history.

(56) References Cited

U.S. PATENT DOCUMENTS

| | | | |
|---|---|---|---|
| 8,782,796 B2 | 7/2014 | Hawthorn et al. | |
| 8,887,284 B2 | 11/2014 | Kovar et al. | |
| 10,108,519 B2 | 10/2018 | Pierson et al. | |
| 10,509,904 B2 | 12/2019 | El Abed et al. | |
| 11,132,441 B2 | 9/2021 | Denney et al. | |
| 11,204,994 B2 | 12/2021 | Rodriguez Bravo et al. | |
| 11,250,132 B2 | 2/2022 | Appleboum et al. | |
| 11,347,671 B2 | 5/2022 | Liebinger Portela et al. | |
| 2013/0179685 A1* | 7/2013 | Weinstein | H04L 63/0428 713/168 |
| 2018/0225230 A1* | 8/2018 | Litichever | G06F 21/82 |

(Continued)

OTHER PUBLICATIONS

"USB Rubber Ducky" by Hak5 LLC, Found Online on [Sep. 6, 2022] https://shop.hak5.org/products/usb-rubber-ducky.

(Continued)

*Primary Examiner* — Carl Adams
(74) *Attorney, Agent, or Firm* — LEGALFORCE RAPC WORLDWIDE

(57) ABSTRACT

A method includes encoding, through a Universal Serial Bus (USB) device enumerated by a computing device communicatively coupled to the USB device solely as a USB keyboard device compatible with the computing device, target information on the computing device into lock key values interpretable through the computing device, with the lock key values pertaining to a number of lock keys associated with the USB keyboard device. The method also includes automatically activating, through the USB device, the number of lock keys indicated by the lock key values on the USB keyboard device, and automatically exfiltrating, through the USB device, the target information out of the computing device and to the USB device based on the computing device reflecting the automatically activated number of lock keys indicated by the lock key values back via an output keyboard endpoint corresponding to the USB keyboard device within the computing device.

20 Claims, 5 Drawing Sheets

(56) References Cited

U.S. PATENT DOCUMENTS

| | | |
|---|---|---|
| 2018/0270194 A1 | 9/2018 | Beitler et al. |
| 2020/0226298 A1 | 7/2020 | Appleboum et al. |
| 2020/0267167 A1 | 8/2020 | Venkataswami et al. |
| 2021/0173939 A1 | 6/2021 | Kotler et al. |

OTHER PUBLICATIONS

"Introducing the New USB Rubber Ducky" by Hak5 LLC, Published Online on [Aug. 8, 2022] https://www.youtube.com/watch?v=r2Gd7BtE0i0&t=1s.

"Keystroke Reflection—New side-channel exfiltration for USB Rubber Ducky" by Hak5 LLC, Published Online on [Aug. 9, 2022] https://www.youtube.com/watch?v=Qg1M3jUCPgw.

"Think you've air-gapped that PC? Hak5's Rubber Ducky says think again . . . " by The Stack, Published Online on [Aug. 9, 2022] https://thestack.technology/keystroke-reflection-air-gap-exfiltration/.

"CTRL-ALT-LED: Leaking Data from Air-Gapped Computers via Keyboard LEDs", Published at 2019 IEEE 43rd Annual Computer Software and Applications Conference (COMPSAC) by Mordechai Guri et al., Published Online on [Jul. 10, 2019] https://arxiv.org/pdf/1907.05851.pdf.

"What are malicious usb keys and how to create a realistic one?" by Elie Bursztein, Published Online on [Aug. 2016] https://elie.net/blog/security/what-are-malicious-usb-keys-and-how-to-create-a-realistic-one/.

"Extracting Data With Keyboard Emulation" by Brian Benchoff, Published Online on [Oct. 30, 2012] https://hackaday.com/2012/10/30/extracting-data-with-keyboard-emulation/.

"Extracting Data With USB HID" by Brian Benchoff, Published Online on [Jan. 26, 2013] https://hackaday.com/2013/01/26/extracting-data-with-usb-hid/.

\* cited by examiner

METHOD AND DEVICE FOR TARGET INFORMATION EXFILTRATION OUT OF A COMPUTING DEVICE BASED ON LOCK KEY REFLECTION BY THE COMPUTING DEVICE AT AN OUTPUT KEYBOARD END POINT

FIELD OF TECHNOLOGY

This disclosure relates generally to information exfiltration and, more particularly, to a device and/or methods of target information exfiltration out of a computing device based on lock key reflection by the computing device at an output keyboard end point.

BACKGROUND

Data exfiltration out of a computing device and/or a storage device may be regarded by some authorities as constituting an "unlawful transfer of information." However, in accordance with many a situation a penetration tester faces, data exfiltration may be required at least as a test operation to understand security vulnerabilities associated with a system and/or a computer network of which said computing device and/or the storage device is a part. Data exfiltration may, however, be stymied through isolating the computer network from unsecured networks and/or strictly implementing endpoint device restrictions in the computing device.

SUMMARY

Disclosed are a device and/or methods of target information exfiltration out of a computing device based on lock key reflection by the computing device at an output keyboard end point.

In one aspect, a method includes encoding, through a Universal Serial Bus (USB) device enumerated by a computing device communicatively coupled to the USB device solely as a USB keyboard device compatible with the computing device, target information on the computing device into a set of lock key values interpretable through the computing device, with the set of lock key values pertaining to a number of lock keys associated with the compatible USB keyboard device. The method also includes automatically activating, through the USB device, the number of lock keys indicated by the set of lock key values on the compatible USB keyboard device, and automatically exfiltrating, through the USB device, the target information out of the computing device and to the USB device based on the computing device reflecting the automatically activated number of lock keys indicated by the set of lock key values back via an output keyboard endpoint corresponding to the compatible USB keyboard device within the computing device.

In another aspect, a non-transitory USB device, readable through a computing device and including instructions embodied therein that are executable through the computing device, includes, in response to communicative coupling between the USB device and the computing device, instructions to cause the USB device to be enumerated by the computing device solely as a USB keyboard device compatible therewith, and instructions to encode target information on the computing device communicatively coupled to the USB device into a set of lock key values interpretable through the computing device, with the set of lock key values pertaining to a number of lock keys associated with the compatible USB keyboard device. The method also includes instructions to automatically activate the number of lock keys indicated by the set of lock key values on the compatible USB keyboard device, and instructions to automatically exfiltrate the target information out of the computing device and to the USB device based on the computing device reflecting the automatically activated number of lock keys indicated by the set of lock key values back via an output keyboard endpoint corresponding to the compatible USB keyboard device within the computing device.

In yet another aspect, a method includes, in response to communicative coupling between a USB device and a computing device, causing the USB device to be enumerated by the computing device solely as a USB keyboard device compatible therewith, and encoding, through the USB device communicatively coupled to the USB device, target information on the computing device into a set of lock key values interpretable through the computing device, with the set of lock key values pertaining to a number of lock keys associated with the compatible USB keyboard device. The method also includes automatically activating, through the USB device, the number of lock keys indicated by the set of lock key values on the compatible USB keyboard device, and automatically exfiltrating, through the USB device, the target information out of the computing device and to the USB device based on the computing device reflecting the automatically activated number of lock keys indicated by the set of lock key values back via an output keyboard endpoint corresponding to the compatible USB keyboard device within the computing device.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a device and/or methods of target information exfiltration out of a computing device based on lock key reflection by the computing device at an output keyboard end point. Although the present embodiments have been described with reference to specific example embodiments, it will be evident that various modifications and changes may be made to these embodiments without departing from the broader spirit and scope of the various embodiments.

Figure 1:
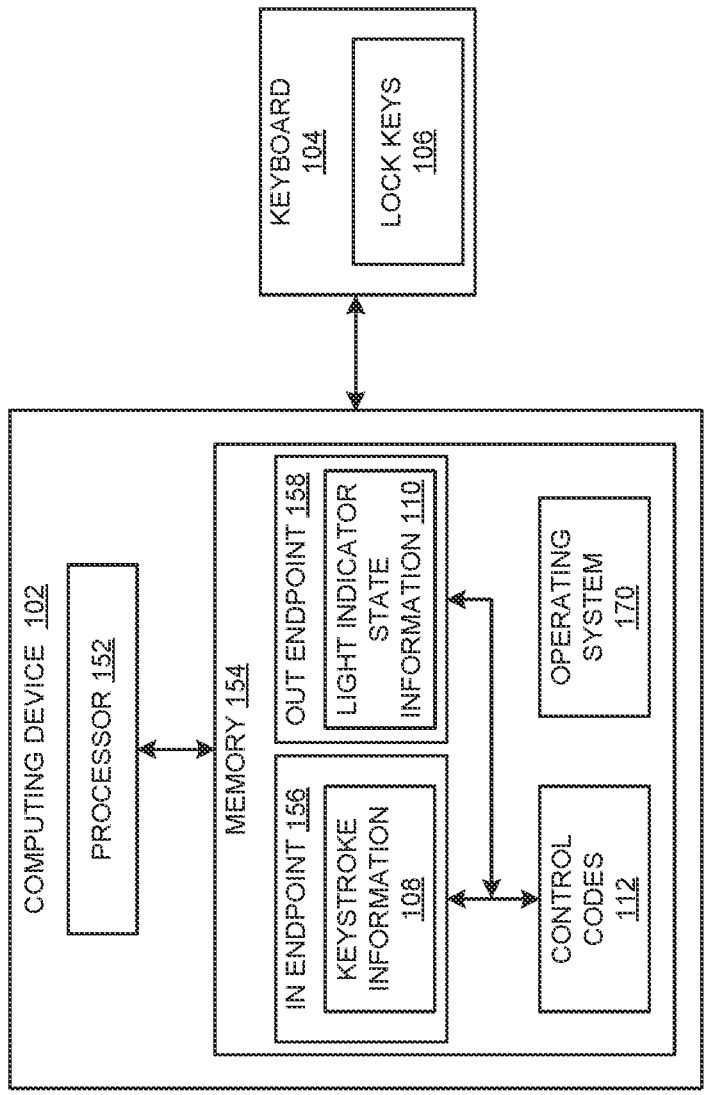
FIG. 1 is a schematic view of a computing device with a keyboard as a peripheral device thereof, according to one or more embodiments.

FIG. 1 shows a computing device 102 with a keyboard 104 as a peripheral (or, Input/Output (I/O)) device thereof, according to one or more embodiments. With regard to the historical context of the evolution of a keyboard and/or an architecture thereof, the original IBM® personal computer (PC) included an 83-key keyboard. This keyboard included three specific lock keys, viz. Caps lock, Num lock and Scroll lock. Each of these keys represented a toggle state related to a change in keyboard behavior with a pressing thereof. For example, the pressing of the Caps lock key in a default setup would cause every subsequent text character key pressed on the computer to be interpreted in an uppercase form thereof. The toggle state represented by each of these keys is indicated through a light on the keyboard.

In the early days, the responsibility of maintaining the toggle states of the abovementioned keys and the lighting of the corresponding Light Emitting Device (LED) indicators rested solely with the keyboard. The introduction of the IBM PC/AT switched the aforementioned responsibility to the computer. This fundamental architectural change carried over to the era of 104+ key keyboards such as keyboard 104. In one or more embodiments, keyboard 104 may be a Universal Standard Bus (USB) Human Interface Device (HID). In one or more embodiments, communication of information related to keystrokes (e.g., keystroke information 108) from keyboard 104 to computing device 102 may be detectable through an input (IN) endpoint, and communication of light indicator states (e.g., light indicator state information 110) of lock keys 106 (shown as a boxed part of keyboard 104 for the sake of illustrative convenience) from computing device 102 to keyboard 104 may be detectable through an output (OUT) endpoint. In one or more embodiments, control codes part of a set of control codes 112 (e.g., including HID control codes) may define the aforementioned communication of light indicator state information 110 from computing device 102 to keyboard 104.

In some embodiments, one or more control codes 112 may be transmitted from computing device 102 to keyboard 104 when computing device 102 starts. For example, a Basic Input Output System (BIOS) firmware or a Unified Extensible Firmware Interface (UEFI) of computing device 102 may provide an option of enabling the Num lock during booting of computing device 102. A corresponding control code 112 may be transmitted to keyboard 104 once computing device 102 is powered on. In one or more embodiments, a lock key 106 may be disabled altogether. For example, a Linux environment of computing device 102 may offer command line tools to displace the Caps lock. A registry edit may accomplish an analogous task in a Microsoft® Windows® environment of computing device 102. In both these cases, keyboard 104 attached to computing device 102 may be agnostic to a configuration of computing device 102; keyboard 104 may, thereby, still transmit a control code 112 that is receivable at an IN endpoint whenever the Caps lock key is pressed. However, in one or more implementations, computing device 102 may disregard a request corresponding to the transmitted control code 112 and not transmit a corresponding light indicator related control code 112 back to keyboard 104 via an OUT endpoint thereof.

Referring back to FIG. 1, computing device 102 is shown as including a processor 152 (e.g., a microprocessor, a set of processors) communicatively coupled to a memory 154 (a volatile and/or a non-volatile memory). In one or more embodiments, memory 154 may include an IN endpoint 156 and an OUT endpoint 158 therein. In one or more embodiments, IN endpoint 156 may be a buffer within memory 154 that receives input related information (e.g., keystroke information 108) from keyboard 104; IN endpoint 156 may refer to an endpoint of input information received from keyboard 104. In one or more embodiments, OUT endpoint 158 may be a buffer (e.g., the same buffer as that of IN endpoint 156 or a different buffer) that receives output related information (e.g., light indicator state information 110) from computing device 102 intended for keyboard 104. FIG. 1 shows IN endpoint 156 as including keystroke information 108 and OUT endpoint 158 as including light indicator state information 110 for the sake of illustration. It should be noted that the information stored in IN endpoint 156 and OUT endpoint 158 may be temporary (e.g., stored in a volatile memory).

In one or more embodiments, all USB HID keyboard devices encompassed by keyboard 104 coupled to computing device 102 may include IN endpoint 156, from which keystrokes from keyboard 104 may be accessible through a target device (e.g., a thin client, a data processing device such as a computing device, a flash storage device, a portable plug-and-play device in general) based on transmission thereto. Similarly, in one or more embodiments, all USB keyboard devices encompassed by keyboard 104 coupled to computing device 102 may include OUT endpoint 158 to which computing device 102 may transmit light indicator state information 110 (e.g., control information) for controlling a light indicator associated with a lock key 106. The aforementioned operation may be validated by coupling a number of keyboards encompassed by keyboard 104 to computing device 102. Here, pressing a Caps lock key, for example, on one keyboard may cause light indicators associated with the Caps lock key on all keyboards to be turned ON. Thus, in one or more embodiments, the synchronous nature of control information transmitted to multiple USB HID OUT endpoints may warrant exploitation thereof through a device that enables performance of systematic functions based on light indicator state information 110 (example control information)/the state of lock keys 106.

Figure 2:
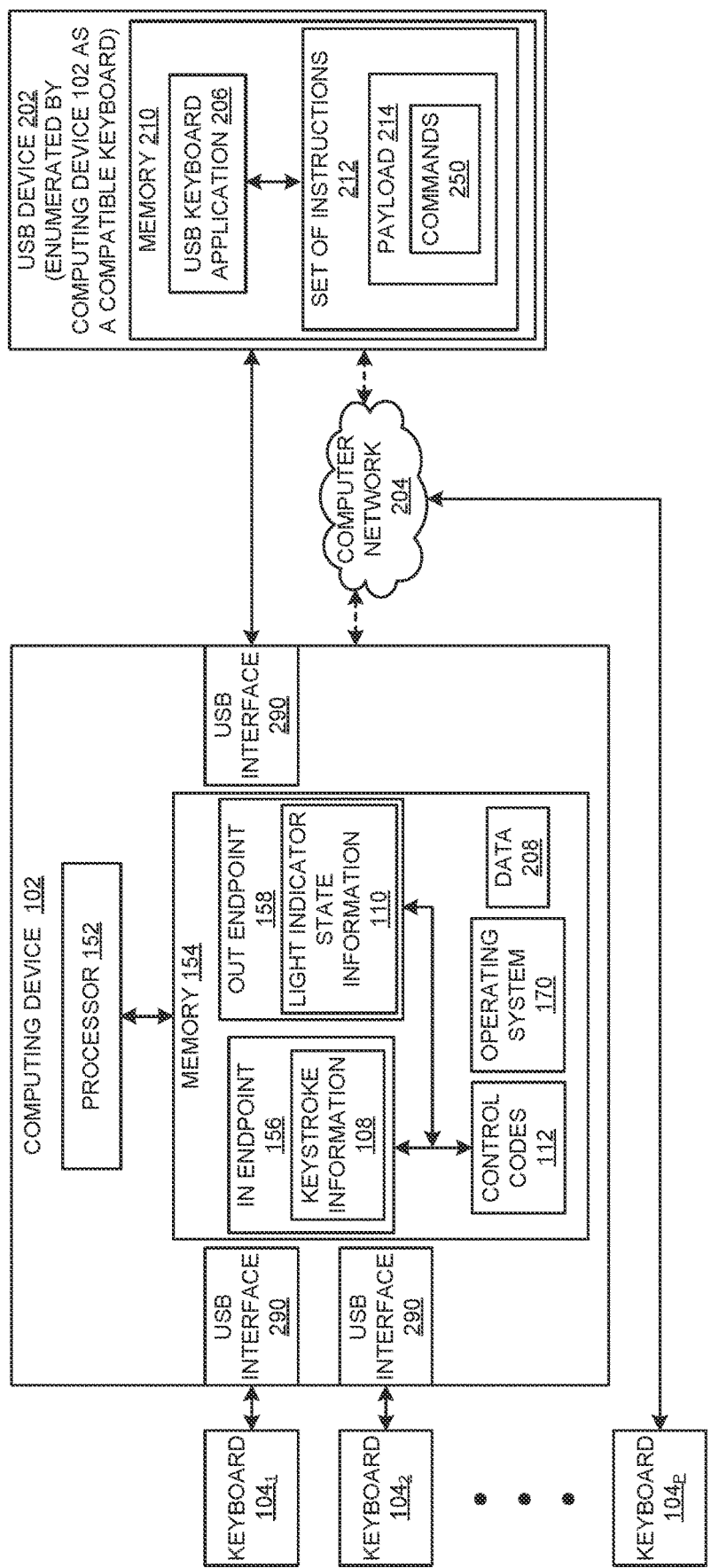
FIG. 2 is a schematic view of a Universal Serial Bus (USB) device communicatively coupled to the computing device of FIG. 1, according to one or more embodiments.

Data exfiltration may relate to transfer of data from computing device 102 or any other device such as a storage device. Some authorities may call data transfer associated with data exfiltration as an unauthorized transfer of systemic information (e.g., information from computing device 102). FIG. 2 shows a USB device (e.g., a USB flash drive, a USB plug-and-play device) 202 communicatively coupled to computing device 102, according to one or more embodiments. In one or more embodiments, USB device 202 may be coupled to computing device 102 through wired means (e.g., via a USB interface 290 available on computing device 102) and/or wirelessly through a computer network 204. In one or more embodiments, computer network 204 may either be a short-range communication network (e.g., based on Bluetooth®) and/or a long-range communication network. In one or more embodiments, in the case of USB device 202 being wirelessly coupled to computing device 102, data communication between USB device 202 and computing device 102 may be through computer network 204.

Keyboard 104, as discussed herein, may also refer to a number of keyboards $104_{1-P}$ coupled to computing device 102 through wired means (e.g., through USB interface 290) and/or wirelessly (e.g., computer network 204). In one or more embodiments, as shown in FIG. 2, computing device 102 may be coupled (e.g., wired and/or wireless means) to a number of keyboards $104_{1-P}$ analogous to keyboard 104. In some embodiments, USB device 202 may be a penetration testing device that simulates an attack performed on computing device 102 to evaluate security thereof. In one or more embodiments, USB device 202 may be programmed with a USB keyboard application 206 (e.g., shown stored in a memory 210 of USB device 202) to enable participation thereof in a USB enumeration process mediated by computing device 102.

In one or more embodiments, coupling USB device 202 to computing device 102 may cause computing device 102 to query USB device 202 for requirements thereof. In one or more embodiments, USB keyboard application 206 on USB device 202 may provide the requisite information in order for USB enumeration by computing device 102 to be completed. In one or more embodiments, once enumerated, USB device 202 is identified by (or, identifies itself with) computing device 102 as a USB HID keyboard analogous to keyboards $104_{1-P}$.

One example of data exfiltration using USB device 202 may include copying data 208 internal to (e.g., stored in memory 154) or accessible through computing device 102 thereto. For the aforementioned purpose and other purposes, in one or more embodiments, a memory 210 (e.g., including USB keyboard application 206) of USB device 202 may be programmed with a set of executable instructions 212 (e.g., in memory 210) that are readable and/or interpretable through processor 152 (and/or an operating system 170 executing on computing device 102/processor 152, as shown in FIG. 1; operating system 170 is shown as part of memory 154 in FIG. 1) of computing device 102 to execute predefined processes and/or commands therein on computing device 102. Another example relates to network exfiltration pertaining to exfiltration over alternative protocols, channels, web services and/or cloud accounts. While some instances of network exfiltration may be detected and mitigated at the network level, some others may continue to occur undetected and/or unmitigated.

For example, a command executed from a Microsoft® Windows® Run dialog may copy all documents (e.g., part of data 208) from a shared folder (e.g., a network folder, a shared documents folder) of a currently logged in account of a user of computing device 102 to a target location (e.g., USB device 202) based on communication involved in, say, a file sharing protocol. In one or more embodiments, as USB device 202 may be enumerated by computing device 102 on being coupled thereto and "seen" as a keyboard device analogous to keyboards $104_{1-P}$, light indicator state information 110 at OUT endpoint 158 may be accessible (e.g., through a set of commands 250 that is part of set of executable instructions 212) thereto. In one or more embodiments, the change in light indicator state information 110 may also be tracked based on access to OUT endpoint 158.

In one or more embodiments, the recognition of USB device 202 as a keyboard device analogous to keyboards $104_{1-P}$ by computing device 102 may enable custom keystroke injection commands executable on computing device 102 based on interpretation of set of executable instructions 212 by computing device 102. An example payload 214 stored as part of set of executable instructions 212 may involve a keystroke deletion command that causes any character typed on any of keyboards $104_{1-P}$ to be deleted automatically on-screen. For the aforementioned purposes, payload 214 may load on computing device 102 following enumeration of USB device 202 as a keyboard device analogous to keyboard 104/keyboards $104_{1-P}$. It should be noted that payload 214 may include commands (e.g., including commands 250 shown in FIG. 2 within payload 214) executable on multiple computing environments (e.g., multiple operating systems, one example of which is operating system 170) to inject keystrokes at will.

In almost the same way as how the keystroke injection discussed above exploits a trust model between computing device 102 and keyboards $104_{1-P}$/USB device 202, exemplary embodiments may relate to keystroke reflection that exploits the architecture established between keyboards $104_{1-P}$/USB device 202. Here, in one or more embodiments, USB device 202 may glean sensitive data from computing device 102 based on keystroke reflection that uses lock keys 106 as a data exfiltration pathway.

In one or more embodiments, the keystroke reflection discussed herein may be particularly useful in performing data exfiltration against computing device 102 on air-gapped networks (e.g., when computer network 204 is isolated from unsecured networks) using USB device 202; traditional network exfiltration techniques may not be viable on air-gapped networks. In one or more embodiments, even a computing device 102 with strict endpoint device restrictions implemented therein may be susceptible to keystroke reflection as typical physical medium exfiltration techniques are not employed therein. In one or more embodiments, keystroke reflection may be a side-channel technique of exfiltration because, rather than relying on any systemic weaknesses and/or security vulnerabilities, the technique may rely on a system design and/or implementation (e.g., the keyboard-computer architecture discussed above).

Figure 3:
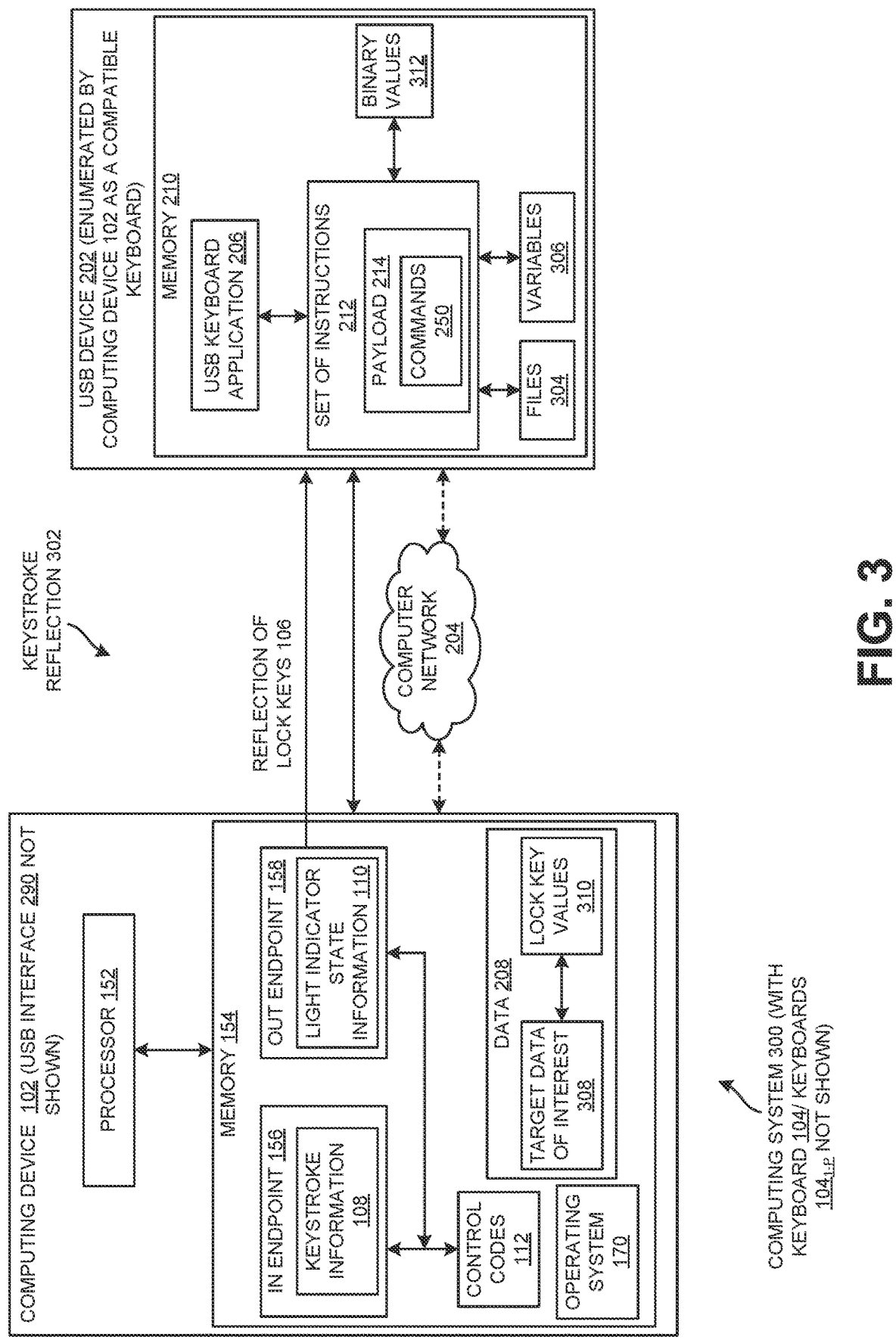
FIG. 3 is a schematic view of a computing system in which keystroke reflection is implemented, according to one or more embodiments.

FIG. 3 shows a computing system 300 in which keystroke reflection 302 is implemented, according to one or more embodiments. In one or more embodiments, one or more or all components of computing system 300 may be similar to FIGS. 1-2. However, in one or more embodiments, keystroke reflection 302 may be employed in computing system 300, whereby both files 304 and variables 306 may be stored directly on USB device 202 without exposure of USB device 202 to computing device 102 (e.g., a target) as a flash drive. FIG. 3 shows both files 304 and variables 306 as part of memory 210 of USB device 202.

In one or more embodiments, keystroke reflection 302 may involve two phases. In one or more embodiments, in a first phase, USB device 202 may obtain target (e.g., computing device 102) data of interest 308 (e.g., part of data 208 and may or may not be related to files 304 and/or variables 306) from computing device 102 as part of a keystroke injection process discussed above. In one or more embodiments, target data of interest 308 (e.g., a password) may then be encoded by USB device 202 as as a set of lock key values (e.g., lock key values 310 interpretable by computing device 102 and part of data 208) based on a custom command that is part of payload 214 within USB device 202; said custom command or command(s) may instruct the encoding discussed herein.

In one or more embodiments, as part of a second phase, USB device 202 may enter a data exfiltration mode, whereby USB device 202 listens (e.g., actively) in on OUT endpoint 158. In one or more embodiments, the encoding discussed above may cause computing device 102 to reflect lock keys 106 indicated by lock key values 310 whenever lock keys 106 indicated by lock key values 310 are activated (or "pressed"). In one or more embodiments, in accordance with the reflection of said lock keys 106 via OUT endpoint 158, binary values 312 corresponding to target data of interest 308 may be transmitted (e.g., for storage thereof in memory 210) to USB device 202.

Figure 4:
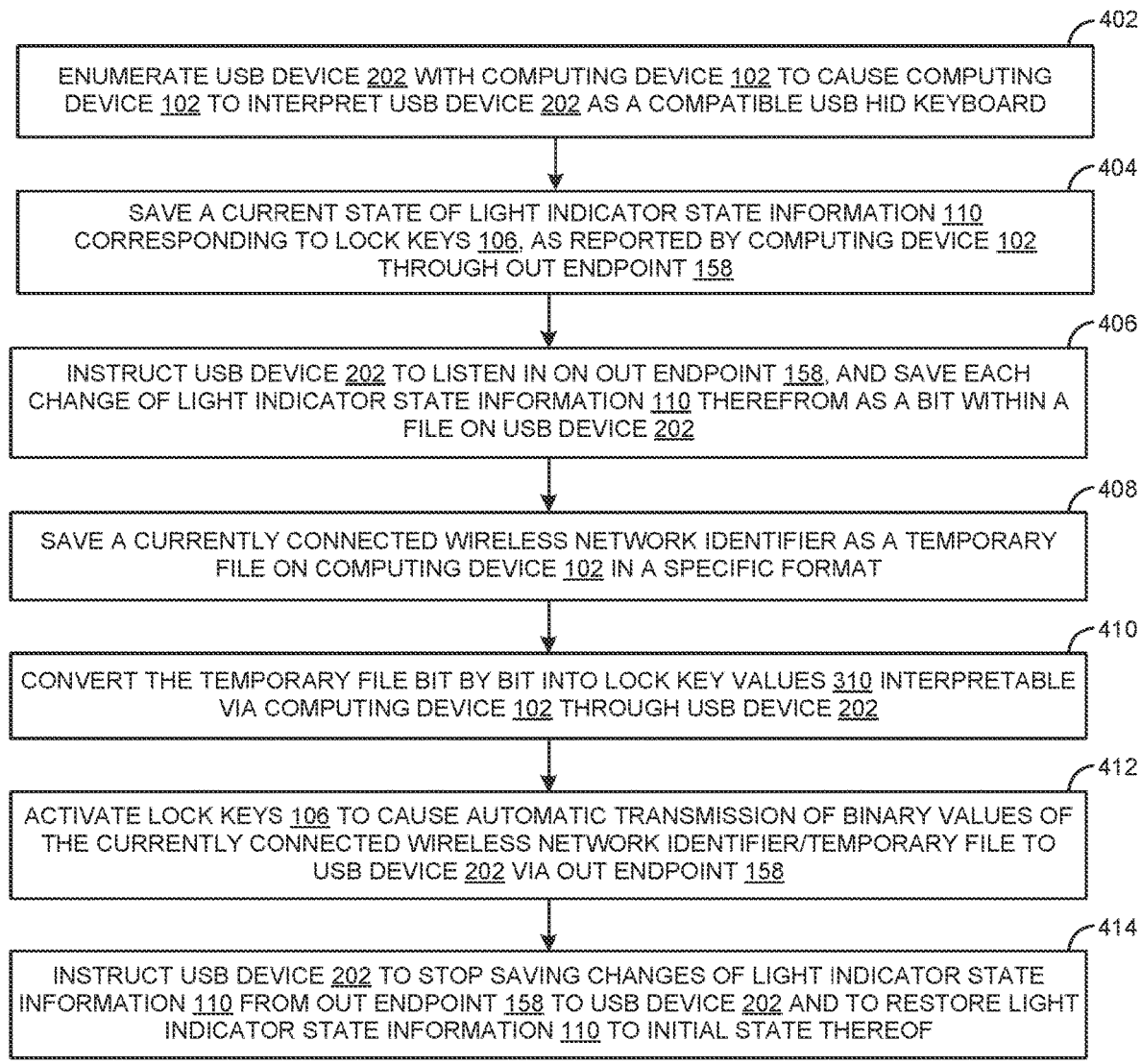
FIG. 4 is a flow diagram of an example data exfiltration process effected through the USB device of FIGS. 2-3, according to one or more embodiments.

FIG. 4 shows an example data exfiltration process effected through USB device 202, according to one or more embodiments. In one or more embodiments, operation 402 may involve enumerating USB device 202 with computing device 102 to cause computing device 102 to interpret USB device 202 as a compatible USB HID keyboard such as keyboard 104 or any of keyboards 104$_{1-P}$. In one or more embodiments, operation 404 may involve executing a command to save (e.g., on USB device 202) a current state of light indicator state information 110 corresponding to lock keys 106, as reported by computing device 102 through OUT endpoint 158. In one or more embodiments, operation 406 may involve executing a command to instruct USB device 202 to listen in on OUT endpoint 158, saving each change of light indicator state information 110 therefrom as a bit within a file on USB device 202.

In one or more embodiments, operation 408 may involve executing a command to save a currently connected wireless network identifier (e.g., target data of interest 308) as a temporary file (e.g., target data of interest 308) on computing device 102 in a specific format (e.g., in standard ASCII). In one or more embodiments, operation 410 may involve converting the temporary file bit by bit into lock key values 310 (e.g., a set of Caps lock and Num lock key values) interpretable via computing device 102 through USB device 202; this may correspond to the encoding discussed above. In one or more embodiments, operation 412 may involve activating (e.g., automatically via a SendKeys.NET class through an application executing on computing device 102; e.g., activation of keys may serve the same purpose as pressing the keys) lock keys 106 to cause automatic transmission of binary values (e.g., binary values 312) of the currently connected wireless network identifier/temporary file (e.g., target data of interest 308) to USB device 202 via OUT endpoint 158. In one or more embodiments, following the transmission, the temporary file on computing device 102 may be deleted.

In one or more embodiments, operation 414 may then involve instructing USB device 202 to stop saving changes of light indicator state information 110 from OUT endpoint 158 to USB device 202 and to restore light indicator state information 110 to the state thereof prior to the data exfiltration. In one or more embodiments, as the activation of lock keys 106 discussed with regard to operation 412 may change light indicator status information 110 from the state thereof prior to the data exfiltration, the restoration of light indicator status information 110 may be required for reducing a forensic footprint of the data exfiltration process. Additional techniques for obfuscation, optimization and/or reducing the footprint of the data exfiltration process may be within the scope of the exemplary embodiments discussed herein.

Thus, in one or more embodiments, the use of USB device 202 for data exfiltration with regard to computing device 102 may help a penetration tester utilizing USB device 202 to be aware of security vulnerabilities within computing device 102 without leaving a footprint thereof. In one or more embodiments, law enforcement may be another area of applicability of the concepts discussed herein based on employment of USB device 202 for obtaining system/network specific and/or personal information from computing device 102. It should be noted that more complex commands and/or operations than discussed herein may be encompassed by the concepts discussed herein. Further, it should be noted that tasks discussed above with regard to USB device 202 may be accomplished through exposing/enumerating USB device 202 to computing device 102 solely as a keyboard. Last but not the least, keyboard 104 and/or keyboards 104$_{1-P}$ may be internal and/or external keyboard devices. All reasonable variations are within the scope of the exemplary embodiments discussed herein.

Figure 5:
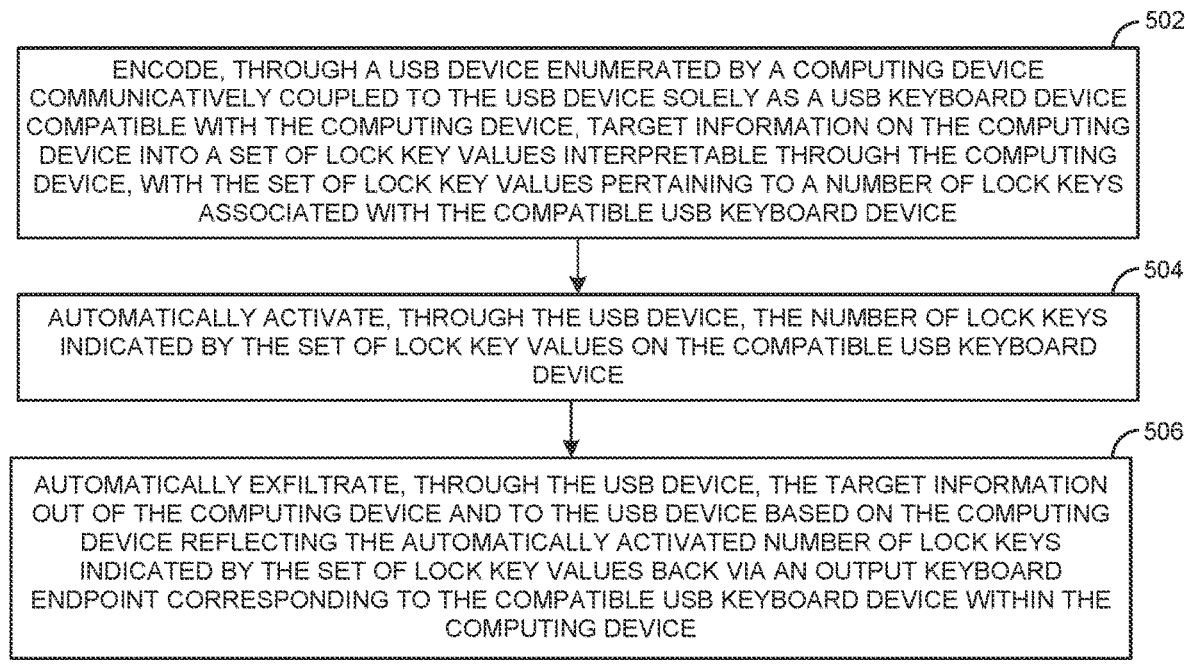
FIG. 5 is a process flow diagram detailing the operations involved in target information exfiltration out of a computing device based on lock key reflection by the computing device at an output keyboard end point, according to one or more embodiments.

FIG. 5 shows a process flow diagram detailing the operations involved in target information exfiltration out of a computing device (e.g., computing device 102) based on lock key reflection by the computing device at an output keyboard end point (e.g., OUT endpoint 158), according to one or more embodiments. In one or more embodiments, operation 502 may involve encoding, through a USB device (e.g., USB device 202) communicatively coupled to the computing device and enumerated by the computing device solely as a USB keyboard device compatible with the computing device, target information (e.g., target data of interest 308) on the computing device into a set of lock key values (e.g., lock key values 310) interpretable through the computing device, with the set of lock key values pertaining to a number of lock keys (e.g., lock keys 106) associated with the compatible USB keyboard device.

In one or more embodiments, operation 504 may involve automatically activating, through the USB device, the number of lock keys indicated by the set of lock key values on the compatible USB keyboard device. In one or more embodiments, operation 506 may then involve automatically exfiltrating, through the USB device, the target information out of the computing device and to the USB device based on the computing device reflecting the automatically activated number of lock keys indicated by the set of lock key values back via the output keyboard endpoint corresponding to the compatible USB keyboard device within the computing device.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine readable medium (e.g., USB device 202)). For example, the various electrical structures and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a non-transitory machine-readable medium (e.g., USB device 202) and/or a machine accessible medium compatible with a data processing system (e.g., computing system 300, computing device 102, USB device 202), and may be performed in any order (e.g., including using means for achieving the various operations). Accordingly, the specification and drawings are to be regarded in an illustrative rather than a restrictive sense.

What is claimed is:
1. A method comprising:
encoding, through a Universal Serial Bus (USB) device enumerated by a computing device communicatively coupled to the USB device solely as a USB keyboard device compatible with the computing device, target information on the computing device into a set of lock key values interpretable through the computing device, the set of lock key values pertaining to a plurality of lock keys associated with the compatible USB keyboard device;

automatically activating, through the USB device, the plurality of lock keys indicated by the set of lock key values on the compatible USB keyboard device; and automatically transferring, through the USB device, the target information out of the computing device and to the USB device based on the computing device reflecting the automatically activated plurality of lock keys indicated by the set of lock key values back via an output keyboard endpoint corresponding to the compatible USB keyboard device within the computing device.

2. The method of claim 1, further comprising performing the encoding of the target information, the automatic activation of the plurality of lock keys and the automatic transfer of the target information out of the computing device based on execution, through the computing device, of a set of custom commands that is part of a payload injected into the computing device by the USB device.

3. The method of claim 1, further comprising the USB device being enumerated by the computing device based on a USB keyboard application programmed into the USB device and configured to participate in an enumeration process mediated through the computing device.

4. The method of claim 1, comprising the USB device communicating with the computing device based on at least one of: a wired connection and a wireless connection.

5. The method of claim 1, comprising the USB device listening in on the output keyboard endpoint, at least during the automatic transfer of the target information via the output keyboard endpoint to the USB device.

6. The method of claim 1, further comprising restoring a state of light indicators corresponding to the plurality of lock keys to a state thereof prior to the automatic transfer following the automatic transfer.

7. The method of claim 1, comprising receiving, through the USB device, the target information via the output keyboard endpoint as binary values.

8. A non-transitory USB device, readable through a computing device and comprising instructions embodied therein that are executable through the computing device, comprising:

in response to communicative coupling between the USB device and the computing device, instructions to cause the USB device to be enumerated by the computing device solely as a USB keyboard device compatible therewith;

instructions to encode target information on the computing device communicatively coupled to the USB device into a set of lock key values interpretable through the computing device, the set of lock key values pertaining to a plurality of lock keys associated with the compatible USB keyboard device;

instructions to automatically activate the plurality of lock keys indicated by the set of lock key values on the compatible USB keyboard device; and instructions to automatically transfer the target information out of the computing device and to the USB device based on the computing device reflecting the automatically activated plurality of lock keys indicated by the set of lock key values back via an air output, keyboard endpoint corresponding to the compatible USB keyboard device within the computing device.

9. The non-transitory USB device of claim 8, further comprising instructions to perform the encoding of the target information, the automatic activation of the plurality of lock keys and the automatic transfer of the target information out of the computing device based on execution, through the computing device, of a set of custom commands that is part of a payload injected into the computing device by the USB device.

10. The non-transitory USB device of claim 8, further comprising instructions associated with a USB keyboard application programmed into the USB device and configured to participate in an enumeration process mediated through the computing device.

11. The non-transitory USB device of claim 8, comprising instructions to trigger USB device to listen in on the output keyboard endpoint at least during the automatic transfer of the target information via the output keyboard endpoint to the USB device.

12. The non-transitory USB device of claim 8, comprising instructions to restore a state of light indicators corresponding to the plurality of lock keys to a state thereof prior to the automatic transfer following the automatic transfer.

13. The non-transitory USB device of claim 8, comprising instructions to receive, through the USB device, the target information via the output keyboard endpoint as binary values.

14. A method comprising:

in response to communicative coupling between a USB device and a computing device, causing the USB device to be enumerated by the computing device solely as a USB keyboard device compatible therewith;

encoding, through the USB device communicatively coupled to Elle USB device, target information on the computing device into a set of lock key values interpretable through the computing device, the set of lock key values pertaining to a plurality of lock keys associated with the compatible USB keyboard device;

automatically activating, through the USB device, the plurality of lock keys indicated by the set of lock key values on the compatible USB keyboard device; and automatically transferring, through the USB device, the target, information out of the computing device and to the USB device based on the computing device reflecting the automatically activated plurality of lock keys indicated by the set of lock key values back via an output, keyboard endpoint corresponding to the compatible USB keyboard device within the computing device.

15. The method of claim 14, further comprising performing the encoding of the target information, the automatic activation of the plurality of lock keys and the automatic transfer of the target information out of the computing device based on execution, through the computing device, of a set of custom commands that is part of a payload injected into the computing device by the USB device.

16. The method of claim 14, further comprising the USB device being enumerated by the computing device based on a USB keyboard application programmed into the USB device and configured to participate in an enumeration process mediated through the computing device.

17. The method of claim 14, comprising the USB device communicating with the computing device based on at least one of: a wired connection and a wireless connection.

18. The method of claim 14, comprising the USB device listening in on the output keyboard endpoint at least during the automatic transfer of the target information via the output keyboard endpoint to the USB device.

19. The method of claim 14, further comprising restoring a state of light indicators corresponding to the plurality of lock keys to a state thereof prior to the automatic transfer following the automatic transfer.

20. The method of claim 14, comprising receiving, through the USB device, the target information via the output keyboard endpoint as binary values.

\* \* \* \* \*